(12) United States Patent  
Silet et al.

(10) Patent No.: US 11,465,754 B2  
(45) Date of Patent: Oct. 11, 2022

(54) PRESSURIZED-AIR SUPPLY UNIT FOR AIRCRAFT

(71) Applicant: SAFRAN POWER UNITS, Toulouse (FR)

(72) Inventors: Fabien Silet, Moissy-Cramayel (FR); Laurent Batailler, Moissy-Cramayel (FR)

(73) Assignee: SAFRAN POWER UNITS, Toulouse (FR)

( * ) Notice: Subject to any disclaimer, the term of this patent is extended or adjusted under 35 U.S.C. 154(b) by 1046 days.

(21) Appl. No.: 16/088,350

(22) PCT Filed: Mar. 22, 2017

(86) PCT No.: PCT/FR2017/050670  
§ 371 (c)(1),  
(2) Date: Sep. 25, 2018

(87) PCT Pub. No.: WO2017/168074  
PCT Pub. Date: Oct. 5, 2017

(65) Prior Publication Data  
US 2019/0077514 A1    Mar. 14, 2019

(30) Foreign Application Priority Data

Mar. 29, 2016 (FR) ...................... 1652692

(51) Int. Cl.  
*B64D 13/00* (2006.01)  
*B64D 13/02* (2006.01)  
(Continued)

(52) U.S. Cl.  
CPC ............. *B64D 13/02* (2013.01); *B64D 41/00* (2013.01); *B64D 2013/0611* (2013.01); *B64D 2013/0644* (2013.01)

(58) Field of Classification Search  
CPC .. F02C 3/10; F02C 3/113; F02C 3/107; F02C 7/268; F02C 7/277; B64D 13/02;  
(Continued)

(56) References Cited

U.S. PATENT DOCUMENTS 5,555,722 A    9/1996  Mehr-Ayin et al.  
6,073,857 A *  6/2000  Gordon ..................... F02C 6/18  
                                                     237/12.1  
(Continued)

FOREIGN PATENT DOCUMENTS

WO    2015145043 A1    10/2015

OTHER PUBLICATIONS

International Search Report dated May 30, 2017 in International Application No. PCT/FR2017/050670 (2 pages).

*Primary Examiner* — Ko-Wei Lin  
(74) *Attorney, Agent, or Firm* — Bookoff McAndrews, PLLC.

(57) ABSTRACT

A pressurized air supply unit (1; 1') for an aircraft, comprising:
  a load compressor (30; 30') configured to supply pressurized air (3), the load compressor (30; 30') having a compressor shaft (23; 23'); and
  a drive portion (10) configured to supply power via an output shaft (20);
the pressurized air supply unit (1; 1) being characterized in that it comprises:
  a gearbox (50);
  an electric motor (40), the electric motor (40) being coupled to said compressor shaft (23; 23') via the gearbox (50); and
  a coupling system (25) configured to enable the output shaft (20) to drive the compressor shaft (23; 23') and to prevent the compressor shaft (23; 23') from driving the output shaft (20), (Continued)

and in that the output shaft (20) and the compressor shaft (23) lie on the same axis.

15 Claims, 1 Drawing Sheet

(51) Int. Cl.
*B64D 41/00* (2006.01)
*B64D 13/06* (2006.01)

(58) Field of Classification Search
CPC .... B64D 2013/0603; B64D 2013/0611; B64D 2013/0644; B64D 2027/026; B64D 41/00
USPC .................................. 454/71, 74; 244/118.5
See application file for complete search history.

(56) References Cited

U.S. PATENT DOCUMENTS

| | | | |
|---|---|---|---|
| 2014/0084677 A1 | 3/2014 | Haillot | |
| 2017/0074169 A1* | 3/2017 | Waissi | F01D 19/00 |
| 2017/0122221 A1* | 5/2017 | Marconi | F02C 3/113 |
| 2020/0391872 A1* | 12/2020 | Bruno | B64D 13/06 |

* cited by examiner

PRESSURIZED-AIR SUPPLY UNIT FOR AIRCRAFT

CROSS-REFERENCE TO RELATED APPLICATIONS

This application is the U.S. national phase entry under 35 U.S.C. § 371 of International Application No. PCT/FR2017/050670, filed Mar. 22, 2017, which claims priority to French Patent Application No. 1652692, filed Mar. 29, 2016, the entireties of each of which are herein incorporated by reference.

FIELD OF THE INVENTION

The present invention relates to a pressurized air supply unit for an aircraft.

For the purposes of the present disclosure, the term "aircraft" should be understood broadly. It comprises fixed-wing aircraft, in particular airplanes with gas turbine engines which are commonly used for transporting passengers, rotary-wing aircraft, and lighter-than-air aircraft.

TECHNICAL BACKGROUND

Most aircraft include an on-board electricity and/or pressurized air supply unit, generally referred to as an auxiliary power unit (APU). Such APUs serve to, by consuming some of the fuel of the aircraft, such an APU serves to provide the aircraft with pressurized air for air conditioning and/or pressurizing the cabin, and/or with electricity for enabling various other pieces of equipment on board the aircraft to operate without making use of the engine(s) of the aircraft, which is particularly useful when the aircraft is parked on the ground with its engine(s) stopped.

Nevertheless, airports and operators are tending more and more to restrict the use of APUs, both for environmental reasons (polluting and noise emissions) and for economic reasons (fuel consumption).

Consequently, in order to deliver electricity and pressurized air to an aircraft parked on the ground, ever-increasing recourse is being had to ground support equipment (GSE). Two types of GSE can be distinguished:
mobile GSE, comprising an electrical ground power unit (GPU) and/or an air conditioning unit (ACU) capable of delivering pressurized air;
fixed GSE, comprising either fixed electrical ground power (FEGP) or sources of pressurized air, i.e., pre-conditioned air (PCA) or an air conditioning unit (ACU).

Nevertheless, GSEs are often dedicated pieces of equipment, i.e. they are capable either of delivering pressurized air or else of delivering electricity, but not both simultaneously. Such equipment is also bulky on the ground, which can lead to difficulties when the space around a parked aircraft is limited.

It can also happen that airports do not have any GSE, or not enough GSE: for example, an airport may have sources of electricity available, but not sources of pressurized air.

Furthermore, a piece of GSE is often less effective than an APU in terms of delivering pressurized air for air conditioning the cabin of the aircraft, in particular under extreme climatic conditions. For example, it can happen that a piece of GSE does not enable the cabin to be cooled sufficiently in a very hot climate (e.g. during summer in airports in the Middle East), or to be heated sufficiently in a very cold climate.

It is therefore desirable to have available a supply unit on board an aircraft that is capable of supplying the aircraft with pressurized air, but without consuming fuel as in conventional APUs.

SUMMARY OF THE INVENTION

The present invention seeks to satisfy this need, at least in part.

This object is achieved by a pressurized air supply unit for aircraft ("APU" hereinafter), comprising:
a load compressor configured to supply pressurized air, the load compressor comprising a compressor shaft;
a drive portion configured to supply power via an output shaft;
an electric motor coupled to said compressor shaft; and
a coupling system configured to enable the output shaft to drive the compressor shaft and to prevent the compressor shaft from driving the output shaft.

The electric motor enables the APU to deliver pressurized air to the aircraft without consuming fuel. When the drive portion is stopped and the electric motor is in operation, due to the coupling system, the output shaft is not driven by the compressor shaft. The electric motor therefore does not needlessly drive the drive portion, thereby achieving a significant saving in terms of electricity consumption.

According to a possibility, the coupling system is a non-controlled coupling system, e.g. a freewheel.

Such a coupling system is lightweight, reliable, and simple to maintain, and it also makes the APU simpler to control.

According to a possibility, the APU further comprises a gearbox, the electric motor being coupled to the compressor shaft via the gearbox.

The gearbox enables the electric motor to be offset from the compressor shaft and the output shaft, thereby enabling the APU to be better integrated in the aircraft.

According to a possibility, the output shaft and the compressor shaft lie on the same axis.

This simplifies integrating the APU in the aircraft and simplifies construction of the gearbox.

According to a possibility, a portion of the output shaft extends through the compressor shaft.

The overall size of the APU is then limited.

According to a possibility, the load compressor is interposed between the gearbox and the drive portion.

This makes it possible to limit the overall size of the gearbox. Also, the load compressor and the compressor of the drive portion are then close enough together to share the same admission inlet for air, which is also beneficial in terms of integrating the APU.

According to a possibility, the gearbox is interposed between the load compressor and the drive portion.

This makes it possible for the load compressor to be offset relative to the output shaft, thus making it possible to obtain better integration of the APU within the aircraft.

According to a possibility, the coupling system is situated in a casing of the gearbox.

According to a possibility, the APU presents a first mode of operation in which the electric motor is electrically powered and drive the load compressor.

In this mode of operation, the APU delivers pressurized air to the aircraft while making use only of an external source of electricity, as is generally available in airports via ground support equipment. This mode of operation serves in particular to air-condition the cabin of the aircraft without the polluting or noise emissions associated with consuming fuel, even in the absence of preconditioned air or of an ACU. Furthermore, unlike such ground equipment, the APU makes it possible to use environmental control systems (ECSs) on board the aircraft, where available, thereby obtaining better control over the air conditioning of the cabin.

According to a possibility, the drive portion comprises a second compressor, a combustion chamber, and a turbine coupled to the output shaft, and presents a second mode of operation in which the turbine is driven by the gas expelled by the combustion chamber, and the electric motor is driven by the turbine.

In the second mode of operation, the APU enables the aircraft to be supplied with pressurized air and/or electricity, even when no external source of electricity is available.

According to a possibility, the electric motor is a reversible motor capable of producing electricity.

Thus, in the second mode of operation, the electric motor can operate as an electricity generator and thus supply electricity to equipment on board the aircraft.

The present invention also provides an aircraft including an APU according to any of the above-described possibilities.

Since the APU is always available onboard the aircraft, the cabin of the aircraft that can be air-conditioned on the ground without consuming fuel, and without any external equipment other than an external source of electricity which is generally available at airports.

According to a possibility, the aircraft further comprises an on-board source of electricity, the electric motor being configured to receive electricity from said on-board source of electricity.

Thus, the APU can operate without consuming fuel, and in the absence of any external source of electricity on the ground.

The present invention also provides a method of starting the APU, the method comprising the following steps:
  starting the drive portion;
  increasing the speed of operation of the drive portion until it reaches a desired rotation speed of the shaft of the electric motor; and
  starting the electric motor and, simultaneously, stopping the drive portion so as to maintain the desired rotation speed of the shaft of the electric motor substantially constant.

BRIEF DESCRIPTION OF THE DRAWINGS

The invention will be well understood and its advantages will better appear upon reading the following detailed description of several embodiments, which are shown as nonlimiting examples. The description refers to the accompanying drawings, in which.

Figure 1:
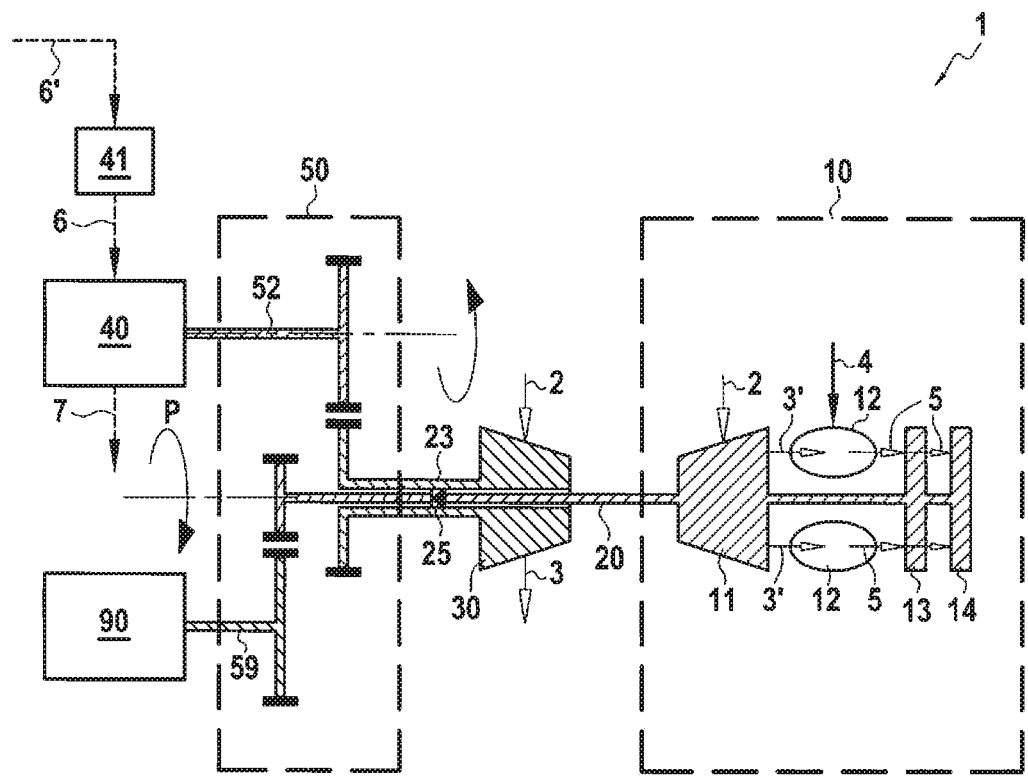
FIG. 1 is a diagram of a unit for supplying pressurized air according to a first embodiment of the invention.

In the drawing, a bold continuous arrow represents a flow of fuel, a fine continuous arrow with an open head represents a flow of air, a dashed-line arrow represents a flow of electrical power, and a curved arrow symbolizes rotation of a shaft.

DETAILED DESCRIPTION OF THE INVENTION

FIG. 1 shows a unit 1 for supplying an aircraft with pressurized air (referred to below as "APU 1" for reasons of convenience) according to a first embodiment of the invention.

The APU 1 comprises a load compressor 30 and a drive portion 10 configured to deliver power via an output shaft 20.

The load compressor 30 compresses air 2 (e.g. outside air taken from the environment of the aircraft in which the APU 1 is installed) and delivers pressurized air 3 to the aircraft, typically to a first piece of equipment (not shown) of the aircraft such as an environmental control system (ECS) on board the aircraft and serving to air-condition the aircraft cabin.

By way of example, the load compressor 30 may be an axial compressor or a centrifugal compressor, the latter being preferred since the overall size and the weight of the load compressor 30 can then be smaller. The load compressor 30 comprises a compressor shaft 23. The compressor shaft 23 may be driven by the output shaft 20, as will be described below.

The APU 1 also comprises an electric motor 40. The electric motor 40 is configured to be powered with electricity 6. To do this, the electric motor 40 is generally electrically connected to an electrical power supply connector 41 configured to receive electricity 6' from an external source of electricity.

In one example, the external source of electricity comprises ground support equipment (GSE) of the GPU or FEGP type. By way of example, the external source of electricity delivers a voltage of 115 volts (V) at a frequency of 400 hertz (Hz). It should be observed that where necessary, the electrical connector 41 may include equipment capable of modifying the voltage, the current, and/or the frequency of the electricity 6' that it receives before delivering it to the electric motor 40.

In addition, or as an alternative, the external source of electricity is a source of electricity on board the aircraft, such as a fuel cell or a battery, thereby enabling the APU 1 to operate even in the absence of ground support equipment (GSE).

The electric motor 40 is coupled to the compressor shaft 23, as will be described in detail below.

The drive portion 10 may be a gas generator comprising a second compressor 11, a combustion chamber 12, a first turbine 13, and a second turbine 14.

The operation of such a gas generator is well known. In outline, the second compressor 11 compresses outside air 2 and delivers pressurized air 3' to the combustion chamber 12. Fuel 4 (which may be fuel on board the aircraft) is burnt in the combustion chamber 12 together with the pressurized air 3' in order to generate high-enthalpy combustion gas 5. The combustion gas 5 is expelled via the combustion chamber 12 and sent to the first turbine 13 and then to the second turbine 14. The combustion gas 5 is subjected to two successive expansions in the first turbine 13 and the second turbine 14, thereby delivering the mechanical work needed for driving the output shaft 20, the load compressor 30, and the electric motor 40.

In the example shown, the first and second turbines 13 and 14 are coupled to the second compressor 11 via the output shaft 20. In another example (not shown), the first turbine 13 may be coupled to the second compressor 11 via a turbine shaft that is different from the output shaft 20, the second turbine 14 being arranged on the output shaft 20.

The APU 1 may also comprise a gearbox 50 that transmits the rotation of the compressor shaft 23 to the electric motor 40 and vice versa. For example, the electric motor 40 is arranged on a motor drive shaft 52 of the gearbox 50. It should be observed that the gearbox 50 is generally surrounded by a casing (not shown).

The gearbox 50 serves to enable the electric motor 40 to be offset from the output shaft 20, thereby making it possible for the APU 1 to be better integrated within the aircraft.

In order to start the drive portion 10, the APU 1 may also include a starter 90, e.g. a conventional electric starter. In the example shown, the starter 90 is arranged on a starter shaft 59 of the gearbox 50.

The APU 1 further comprises a coupling system 25 interposed between the compressor shaft 23 and the output shaft 20.

The coupling system 25 is configured to enable the output shaft 20 to drive the compressor shaft 23 and to prevent the compressor shaft 23 from driving the output shaft 20. In other words, the coupling system 25 is configured in such a manner that, when the compressor shaft 23 is rotating faster than the output shaft 20, the compressor shaft 23 does not transmit any torque to the output shaft 20, and in such a manner that, when the output shaft 20 is rotating faster than the compressor shaft 23, the output shaft 20 transmits torque to the compressor shaft 23 and drives it rotationally, typically at the same speed as itself.

The APU 1 presents a first mode of operation for delivering pressurized air to the aircraft without consuming fuel 4.

In this mode of operation, the APU 1 is powered with electricity 6' by an external source of electricity such as ground support equipment (GSE), an electric motor 40 is powered with electricity 6 via the electrical connector 41. Thereby, the electric motor 40 operates and drives the compressor shaft 23, and thus the compressor 30. The load compressor 30 then delivers pressurized air 3 to the aircraft.

According to the invention, a method of supplying pressurized air to an aircraft by using the APU 1 comprises the following steps:

supplying electricity to the APU 1 via the electricity supply connector 41; and supplying the aircraft with the pressurized air 3 that is produced by the load compressor 30.

Thus, the aircraft is supplied with pressurized air 3, even though the APU 1 is supplied only with electricity 6 and not with fuel 4. In other words, the APU 1 can supply pressurized air 3 without it being necessary to start the drive portion 10, and thus without the associated polluting and noise emissions. Nor is there any need to involve any GSE in order to supply the aircraft with pressurized air.

In this mode of operation, the coupling system 25 decouples the compressor shaft 23 from the output shaft 20: thus, the electric motor 40 does not need needlessly to overcome the resistive torque from the drive portion 10 on starting, nor does it need needlessly to drive the drive portion 10 under steady conditions. This results in an appreciable saving in terms of electricity consumption and of time to start the APU 1.

Preferably, the coupling system 25 is non-controlled, i.e. it does not have a control unit and/or actuators configured to couple and to uncouple the compressor shaft 23 and the output shaft 20. In other words, the coupling system 25 is configured in such a manner that coupling and uncoupling between the compressor shaft 23 and the output shaft 20 take place without any external command, e.g. mechanically, as a function of the respective speeds of rotation of the compressor shaft 23 and of the output shaft 20.

Compared with a conventional controlled coupling system, such a non-controlled coupling system is considerably lighter in weight, more reliable, and simpler to maintain, since it does not include actuators that are heavy, complex, and difficult to maintain. Also, with a non-controlled coupling system, control of the APU 1 is simplified.

Preferably, the coupling system 25 is an overrunning clutch or "free wheel". Freewheels suitable for the ranges of rotation speed and of torque involved by operation of the drive portion 10 are well known to the person skilled in the art and are therefore not described in detail herein.

Preferably, the freewheel is a roller freewheel. That type of freewheel is particularly suitable for the ranges of speeds of rotation and of torque generated by operation of the drive portion 10. By way of illustrative example, when the drive portion 10 is in operation, the output shaft 20 rotates at a speed lying in the range 20,000 revolutions per minute (rpm) to 100,000 rpm, and the freewheel transmits a torque of 50 newton-meters (N·m) to 1000 N·m.

Preferably, the roller freewheel is a centrifugal throwout freewheel, i.e. when the freewheel leads to mechanical decoupling between the output shaft 20 and the compressor shaft 23, the rollers rub initially against an inside track and subsequently leave the inside track under the effect of centrifugal force. Thus, when the output shaft 20 and the compressor shaft 23 are decoupled, the rollers do not rub any more, thereby increasing the lifetime of the freewheel. The roller freewheel could also be a positive continuous engagement freewheel.

Preferably, the freewheel is configured in such a manner that the output shaft 20 drives the compressor shaft 23 and soon as the output shaft 20 is rotationally driven by the drive portion 10. In other words, the freewheel is configured in such a manner that the coupling between the output shaft 20 and the compressor shaft 23 takes place without any need for the output shaft 20 to reach some minimum rotation speed.

The APU 1 also presents a second mode of operation for supplying the aircraft with pressurized air, even in the absence of an external source of electricity.

In the second mode of operation, the combustion chamber 12 produces high-enthalpy combustion gas 5 that drives the first turbine 13 and the second turbine 14, as already explained above. The turbines 13 and 14 then drive the output shaft 20. Since the output shaft 20 is driven, the coupling system 25 enables the output shaft 20 to drive the compressor shaft 23. Thereby, the load compressor 30 is driven and delivers pressurized air 3 to the aircraft.

According to the invention, another method of supplying pressurized air to an aircraft by using the APU 1 comprises the following steps:

supplying the combustion chamber 12 with air 3' compressed by the second compressor 11 and with fuel 4; and supplying the aircraft with the pressurized air 3 that is produced by the load compressor 30.

Thus, the cabin of the aircraft can be air-conditioned, even in the absence of any external source of electricity.

In certain embodiments, the electric motor 40 is a reversible motor, i.e. an electric motor that is capable of producing electricity when it is supplied with mechanical power. In other words, the electric motor 40 can also operate as an electricity generator. Under such circumstances, in the second mode of operation, the electric motor 40 is driven by the output shaft 20 via the compressor shaft 23 and the gearbox 50. The electric motor 40 produces electricity 7, which is typically supplied to a second piece of equipment (not shown) of the aircraft, such as a de-icer system, a system for starting the main engines, the on-board network of the aircraft, etc.

According to the invention, a method of supplying an aircraft with electricity using the APU 1, in which the electric motor 40 is a reversible motor, comprises the following steps:
- supplying the combustion chamber 12 with fuel 4 and with air 3' compressed by the second compressor 11; and
- supplying the electricity 7 produced by the electric motor 40 to the aircraft.

According to the invention, a method of supplying an aircraft with pressurized air and with electricity using the APU 1, in which the electric motor 40 is a reversible motor, comprises the following steps:
- supplying the combustion chamber 12 with fuel 4 and with air 3' compressed by the second compressor 11;
- supplying the aircraft with the pressurized air 3 that is produced by the load compressor 30; and
- supplying the electricity 7 produced by the electric motor 40 to the aircraft.

In certain embodiments (not shown), the starter 90 is a reversible electric motor. The starter 90 is then capable of producing electricity 7 when it is driven by the output shaft 20 via the gearbox 50, and thus of performing the same function as the electric motor 40 in the above-described methods.

The APU 1 may be launched in the first mode of operation as follows.

First, the drive portion 10 is started by using the starter 90. Once the drive portion 10 is started, its speed of operation is increased (e.g. by increasing the flow rates of fuel 4 and of pressurized air 3') until the motor drive shaft 52 reaches a desired rotation speed, which rotation speed may correspond by way of example to the rotation speed needed for obtaining the flow rate of pressurized air 3 needed by the first piece of equipment. The output shaft 20 then drives the compressor shaft 23 via the coupling system 25, as explained above. Thereby, the load compressor 30 (and optionally the electric motor 40) are rotationally driven.

Once the motor drive shaft 52 reaches the desired rotation speed, the electric motor 40 is started, i.e. electrical power is supplied to the electric motor 40 and is increased until reaching the power level needed to maintain the rotation speed desired for the motor drive shaft 52, and simultaneously the drive portion 10 is stopped (e.g. by progressively reducing the delivery of fuel 4), so that the rotation speed desired for the motor drive shaft 52 is substantially maintained.

In this way, in order to start the electric motor 40, the only electrical power that needs to be supplied is the power needed for overcoming the resistive torque internal to the electric motor 40. In contrast, if the APU 1 were to be started by starting the electric motor 40 directly, it would be necessary to supply the motor with sufficient power to overcome both its own resistive torque and also with the resistive torque of the load compressor 30. The electrical connector 41 can thus be configured for lower maximum electrical power, which is beneficial in terms of the size and the weight of the APU 1.

Preferably, a portion of the output shaft 20 extends through the compressor shaft 23, thus enabling the overall size of the APU 1 to be limited.

Preferably, the output shaft 20 and the compressor shaft 23 are coaxial, with the direction of rotation of the output shaft 20 being identified by reference P in FIG. 1. This makes it possible to simplify the construction of the coupling system 25 and the way it is mounted in the APU 1.

Preferably, and as shown in FIG. 1, the load compressor 30 is situated or interposed between the drive portion 10 and the gearbox 50, i.e. the compressor shaft 23 is driven by the output shaft 20 via the coupling system 25, without involving the gearbox 50. The gearbox 50 thus presents only one input for the output shaft 20 and the compressor shaft 23, and two outputs, respectively one for the motor drive shaft 52 and one for the starter shaft 59. This makes it possible to limit the overall size of the gearbox 50. Also, the load compressor 30 and the second compressor 11 are close enough together to share the same admission inlet for air 2, which is also beneficial in terms of integrating the APU 1.

Preferably, the coupling system 25 is situated in a casing of the gearbox 50, thereby making it possible to use the lubrication system internal to the gearbox 50 for lubricating the coupling system 25.

Figure 2:
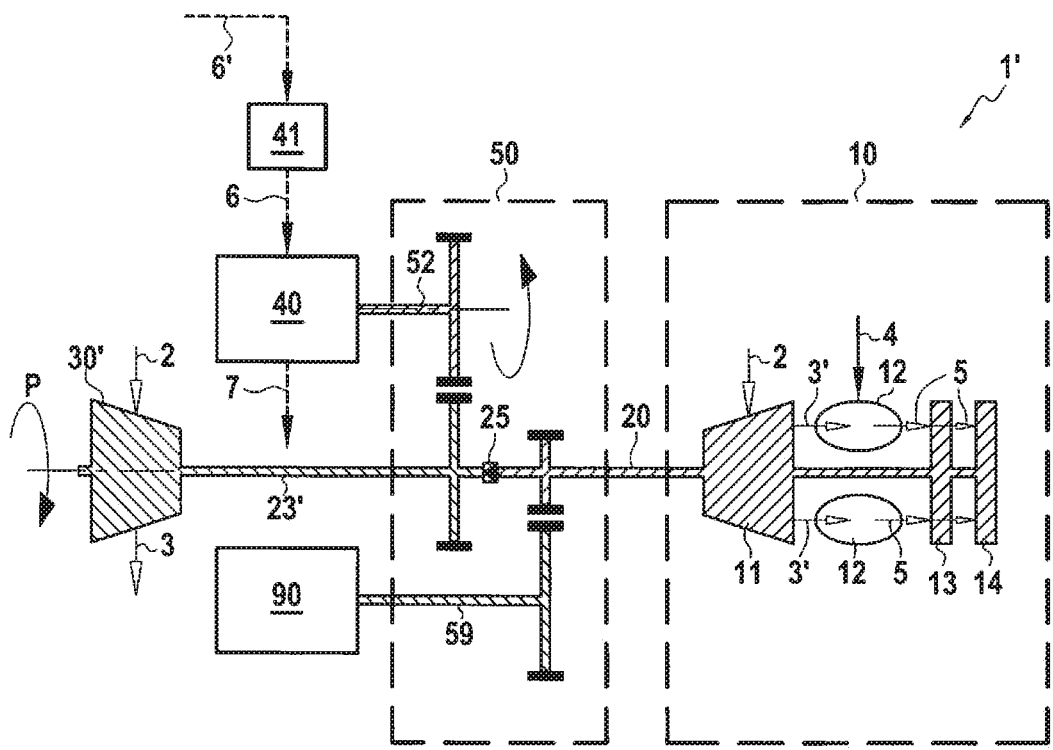
FIG. 2 is a diagram of a unit for supplying pressurized air according to a second embodiment of the invention.

FIG. 2 shows an APU 1' according to a second embodiment of the invention. Elements that are identical to those of the first embodiment are identified by identical reference signs and they are not described again in detail.

In this second embodiment, the load compressor (referenced 30') is situated at an outlet from the gearbox 50. Thus, the gearbox 50 is interposed between the load compressor 30' and the drive portion 10. When the output shaft 20 drives the compressor shaft 23' of the load compressor 30', this takes place via the gearbox 30 and the coupling system 25. This embodiment makes it possible for the load compressor 30' to be remote from the output shaft 20, which makes it possible to obtain better integration of the APU 1' within the aircraft.

The coupling system 25 may be situated in a casing of the gearbox 50 and integrated therein, as shown in FIG. 2, such that the starter shaft 59 is coupled to the output shaft 20 via the gearbox 50, and not via the coupling system 25. This enables the starter 90 to drive the output shaft 50 and thus to start the drive portion 10. Furthermore, it is then possible to use the lubrication system that is internal to the gearbox 50 for lubricating the coupling system 25.

Preferably, the output shaft 20 and the compressor shaft 23' are on the same axis, with the direction of rotation of the output shaft 20 being identified by reference P in FIG. 2. Thus, there is no need to provide the gearbox 50 with a gearwheel for transmitting torque from the output shaft 20 to the compressor shaft 23', since this torque is transmitted via the coupling system 25.

The operation of the APU 1' is identical to the operation of the APU 1, and is therefore not described in detail.

The present invention provides an APU that is capable, depending on the ground equipment available at the airport where the aircraft is parked, of supplying equipment of the aircraft with pressurized air and/or with electricity, even in the absence of an external source of pressurized air. Also, when an external source of electricity is available, the APU of the invention enables to supply pressurized air, and therefore to air-condition the cabin of the aircraft, without any polluting or noise emissions associated with consuming fuel.

It should be observed that the modes of operation described above are obtained using a single coupling system, namely the coupling system 25, thereby limiting the complexity of the APU 1 or 1'.

Furthermore, it should be observed that the second above-described mode of operation is entirely suitable for use when the aircraft is not on the ground, e.g. in the event of a failure of equipment that is normally used for supplying pressurized air and/or electricity to the aircraft while in flight (e.g. by using power produced by the engines of the aircraft).

Finally, although not shown in the figures, the APU 1 (or 1') may include a control unit connected to various sensors and actuators and configured to measure and/or control various operating parameters of the APU, such as the speeds of rotation of the output shaft 20 and of the compressor shaft 23, the flow rates and the pressures of the air at the inlet and at the outlet of the load compressor 30 (or 30') and of the second compressor 11, the flow rate of fuel 4 at the inlet of the combustion chamber 12, the voltage supplied to the electric motor 40 or delivered by the electric motor 40, etc. The control unit may also control activation or deactivation of the APU 1 (or 1') or switching between its various modes of operation, e.g. on the basis of a command supplied by a user.

Although the present invention has been described with reference to specific embodiments, it is obvious that modifications and changes may be undertaken on those embodiments without going beyond the general ambit of the invention as defined by the claims. Also, individual characteristics of the various embodiments mentioned may be combined in additional embodiments. Consequently, the description and the drawings should be considered in a sense that is illustrative rather than restrictive.

The invention claimed is:

1. A pressurized air supply unit for an aircraft, comprising:
    a load compressor configured to supply pressurized air, the load compressor comprising a compressor shaft; and
    a gas generator configured to supply power via an output shaft;
    a gearbox;
    an electric motor, the electric motor being coupled to said compressor shaft via the gearbox; and
    a coupler configured to enable the output shaft to drive the compressor shaft and to prevent the compressor shaft from driving the output shaft,
    wherein the output shaft and the compressor shaft lie on the same axis.

2. The pressurized air supply unit for an aircraft according to claim 1, wherein the coupler is a non-controlled coupler.

3. The pressurized air supply unit for an aircraft according to claim 2, wherein the non-controlled coupler includes a freewheel.

4. The pressurized air supply unit for an aircraft according to claim 1, wherein a portion of the output shaft extends through the compressor shaft.

5. The pressurized air supply unit for an aircraft according to claim 4, wherein the load compressor is interposed between the gearbox and the gas generator.

6. The pressurized air supply unit for an aircraft according to claim 1, wherein the gearbox is interposed between the load compressor and the gas generator.

7. The pressurized air supply unit for an aircraft according to claim 1, wherein the coupler is situated in a casing of the gearbox.

8. The pressurized air supply unit for an aircraft according to claim 1, wherein the electric motor is a reversible motor capable of producing electricity.

9. An aircraft including the pressurized air supply unit according to claim 1.

10. The aircraft according to claim 9, further comprising an on-board source of electricity, the electric motor being configured to receive electricity from said on-board source of electricity.

11. The pressurized air supply unit for an aircraft according to claim 1, wherein the coupler comprises a clutch.

12. The pressurized air supply unit for an aircraft according to claim 1, wherein the coupler comprises a roller freewheel.

13. The pressurized air supply unit for an aircraft according to claim 1, wherein the coupler comprises a freewheel.

14. The pressurized air supply unit for an aircraft according to claim 1, wherein the coupler comprises a centrifugal throwout freewheel.

15. A method of starting the pressurized air supply unit for an aircraft according to claim 1, the method comprising the following steps:
    starting the gas generator;
    increasing a speed of operation of the gas generator until it reaches a desired rotation speed of a shaft of the electric motor; and
    starting the electric motor and, simultaneously, stopping the gas generator so as to maintain the desired rotation speed of the shaft of the electric motor substantially constant.

* * * * *